Dec. 23, 1958 — W. V. GARRIS — 2,865,300
SEALING SYSTEM FOR CENTRIFUGAL PUMPS
Filed Feb. 6, 1957
Fig. 1.
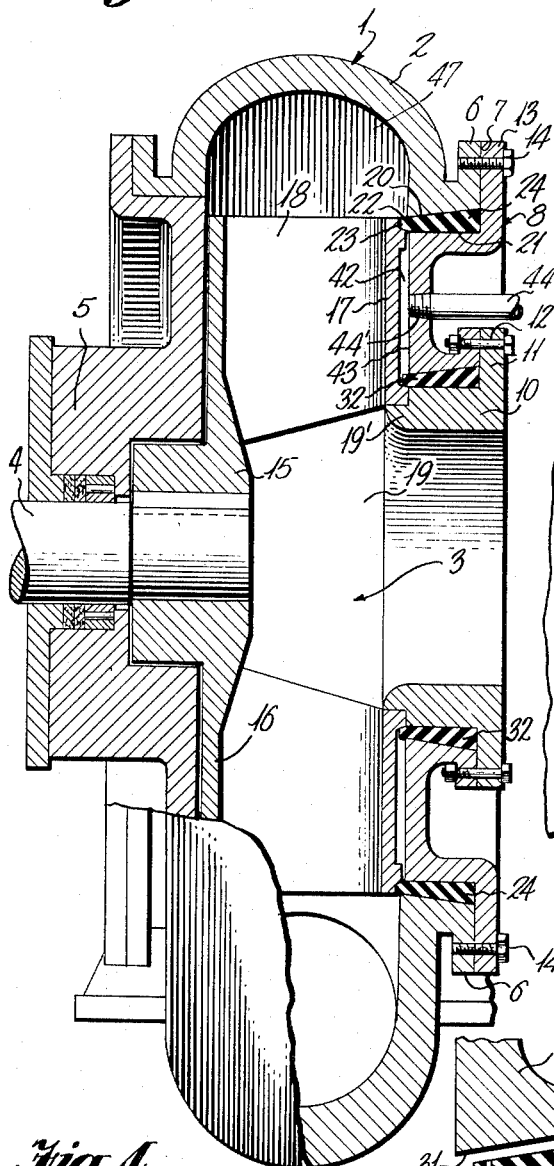
Fig. 2.
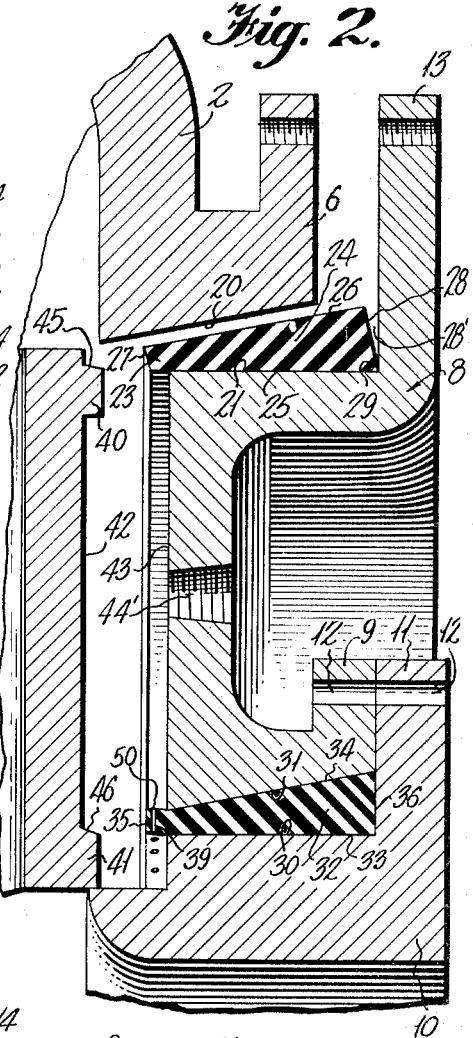
Fig. 4.
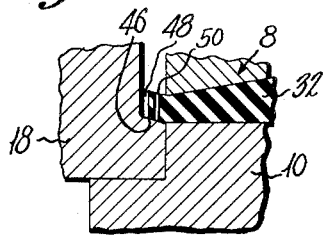
Fig. 3.
INVENTOR
William V. Garris
BY Mason, Fenwick & Lawrence
ATTORNEYS

United States Patent Office 2,865,300
Patented Dec. 23, 1958

2,865,300

SEALING SYSTEM FOR CENTRIFUGAL PUMPS

William V. Garris, Augusta, Ga., assignor to Georgia Iron Works Co., Augusta, Ga., a corporation of Georgia Application February 6, 1957, Serial No. 638,505

4 Claims. (Cl. 103—111)

This invention relates to centrifugal pumps, designed to handle liquids, and particularly liquids containing or conveying solids. The invention is an improvement in pumps of the type disclosed in the patent to Hogan 2,270,054, granted January 13, 1942. Such pumps find an extensive field of use as sand pumps in dredging operations, in which use considerable difficulty is encountered in maintaining a proper seal in order to prevent recirculation of material in the pump. Such recirculation is due to the fact that inherently the pressure is much higher at the periphery of the impeller than at the suction eye of the pump, and that wide clearance has to be maintained between the impeller and the surrounding shell of the pump to prevent excessive wear by the abrasives in the water. This clearance permits an appreciable portion of the discharging water to be forced back between the impeller and shell toward the suction eye, thus reducing the efficiency of the pump. In the Hogan patent, which is representative of a type, this recirculation is avoided by maintaining a region of pressure, between the periphery of the impeller and the suction eye of higher value than the discharge pressure. This is done by providing a chamber between the suction face plate and the impeller to which liquid, generally water, is admitted under higher pressure than the discharge pressure, and sealing off this chamber against substantial outflow either toward the discharge end of the impeller or toward the suction eye. Since the seal is between the fixed face plate and the rotatable impeller, Hogan was put to the rather complicated and costly expedient of providing an adapter plate bolted coaxially to the impeller, formed with machined concentric inner and outer races, and machined seats in the face plate for rubber gaskets which ride upon said races, and machined steel retaining rings for holding the gaskets in their seats on the face plate.

One of the objects of the present invention is to provide a pump of the Hogan type in which the necessity for an adapter plate, machined gasket seats in the face plate, and machined gasket retaining rings is eliminated.

Another object of the invention is the provision of tapered races integral with the impeller and concentric with respect to the axis of the impeller, in cooperation with a gasket system in which the suction face plate is separate from the suction inlet nozzle, and with it forms an annular closure for the side of the shell, cooperating with the inlet nozzle on the one hand and the peripheral portion of the shell on the other to form gasket recesses of wedge shaped cross-section. The inlet nozzle provides the central opening or "eye" of the pump.

A further object of the invention is the provision of concentric annular races extending outwardly from the impeller and in a plane perpendicular to the axis of the impeller, having their faces remote from said axis chamfered so as to taper outwardly and downwardly toward said axis, in cooperation with a gasket system in which the suction face plate is separate from the suction inlet nozzle, cooperating with the inlet nozzle on the one hand and the bounding wall of the side opening in its shell, on the other, to form annular gasket seats of wedge shaped cross-section, having their narrow ends opening toward the tapered races and preformed annular gaskets of wedge shaped cross-section of rubber or synthetic material having the noncompressible, distortable characteristics of rubber, confined under pressure with said recess and having therein narrow ends projecting beyond said recess, said gaskets being confined under such selectively applied pressure as to cause said projecting ends to be distorted in such manner that they flare outwardly, whereby they cam upon the tapered faces of the races when said face plate and suction inlet nozzle are drawn up into close relation to said shell.

Other objects of the invention will appear as the following description of a practical embodiment thereof proceeds.

In the drawing:

Figure 1 is a view in side elevation, partly in section, of a centrifugal pump embodying the principles of the invention;

Figure 2 is a fragmentary view in an axial plane, showing the outer gasket undistorted and the inner one distorted;

Figure 3 is a fragmentary view, in an axial plane, showing the inner gasket undistorted;

Figure 4 is a fragmentary view, in an axial plane, showing a portion of the inner gasket distorted.

Referring now in detail to the structure illustrated by the drawing, the numeral 1 represents a centrifugal pump comprising a volute shell 2, an impeller 3, a drive shaft 4, upon the end of which the impeller is mounted and a packed bearing 5. The shell on the side opposite the packed bearing has a large opening concentric with the drive shaft surrounded by an outwardly extending flange 6, having a planiform outer face 7, the peripheral portion of said opening being closed by an annular face plate 8 which in turn has a coaxial opening, also surrounded by a peripheral flange 9. A suction inlet nozzle 10 extends within the opening of the face plate, having an outwardly extending flange 11 which rests against the flange 9, both flanges having registering holes 12 for bolts which secure the inlet nozzle to the face plate with its central opening concentric with the axis of the drive shaft. The face plate 8 has an outwardly extending peripheral flange 13 that rests against the flange 6, both of these flanges also having registering bolt holes with bolts 14 for securing the face plate and with it the inlet nozzle to the shell.

It will be observed from Figure 1 that the impeller is a unitary structure, preferably an integral casting comprising on one side a hub 15 keyed to the drive shaft, and a circular side wall 16 extending from the hub outwardly to a radial distance substantially equal to the radius of the opening in the suction side of the shell. On the suction side the impeller comprises the annular wall 17, the two walls being formed by the transverse webs 18, which on the suction side may terminate inwardly flush with the inner circumference of the wall 17, and in any event, they terminate short of the produced axis of the drive shaft so that the central portion of the impeller is an unobstructed inlet chamber 19 in communication, on the one hand, with the inlet nozzle 10, and on the other hand, with the radial spaces between the webs 18. It will be noted that the suction inlet nozzle has a flared lip 19' extending within the central opening of the wall 17, having a circumferential face that rotates close to the bounding circumference of said opening. Considerable clearance is allowed at the joint to permit relatively easy disassemblage of the pump in the field, since in a pump of this type, if the clearance is slight, the parts will "freeze" during periods of disuse, so that through corrosion, it will be almost impossible to separate them. Furthermore, wide clearance is provided between the side 17 of the impeller and the face plate to prevent excessive friction and wear from the silt caused by the water that tends to backflow between the impeller and face plate from the discharge channel 47 of the shell to the inlet nozzle 10, due to the pressure differential between these points.

The efficiency of the pump would be greatly reduced by the recirculation of liquid, so that it has become conventional to interpose a substantially confined body of water or other liquid under pressure greater than the discharge pressure of the pump, the pressure being maintained by annular sealed joints between the impeller and face plate, respectively adjacent the inlet nozzle and the periphery of the impeller. Such seals, in general, involve the provision of concentric races on the impeller, and rubber or synthetic rubber-like gaskets projecting from the interior of the face plate into wiping contact with the races.

For the most part prior seals have failed to recognize the fact that rubber is not compressible, but deformable, and gaskets have been inefficiently designed and installed to take advantage of the elasticity and presumed compressibility of rubber, such gaskets necessitating complicated and expensive means for seating them, and being short-lived and inefficient in operation.

The sealing system of the present invention is founded upon the property of deformability which characterizes rubber, and designed accordingly, so that an extremely simple, inexpensive and efficient construction is made possible.

Adverting again to the several figures of the drawing, it is noted that the opening in the shell on the suction side is bounded by a deep outwardly flared circumferential wall 20, and that the annular face plate 8 extends depthwise inwardly with respect to its flange 13 a distance substantially equal to the thickness of the shell adjacent the wall 20, having an outer bounding cylindrical wall 21, perpendicular to the flange 13, substantially equal in depth to the wall 20.

When the face plate is in place, bolted concentrically to the opening in the shell, as in Figure 1, an annular gasket channel is defined between said face plate and shell, the cross-sectional shape of which channel corresponds to that of a right triangle, the side 21 being the base and the side 20 the hypotenuse. The shape is actually that of a truncated right triangle, since it terminates in the narrow annular opening 22 through which the lip 23 of the gasket protrudes. The gasket 24 is annular, having an inner cylindrical bounding face 25 and an outer inclined bounding face 26, which is parallel to the face 25 when the face plate is coaxial with the side opening in the shell. The faces 25 and 26 are, however, longer than the walls 20 and 21 against which they are to seat, so that the narrow end or lip 23 of the gasket projects beyond the opening 22 of the gasket channel. The gasket 24, in the repose state of its mass is trapezoidal in its cross-sectional shape, the circumferential walls being nonparallel, while the narrow and wide end faces 27 and 28 are parallel. The base angle 29 of the gasket is less than a right angle, so that when the gasket is seated upon the cylindrical extension of the face plate, as seen in Figure 2, a displacement cavity 28' is formed between the end face 28 of the gasket and the adjacent end wall of the channel. The volume of the mass of the gasket is at least equal to the volume of the gasket channel, and from the practical standpoint, slightly greater. When the face plate is moved toward the shell, its coaxial relation to the shell being maintained, the wall 20 comes into surface engagement with the face 25 of the gasket before the flanges 6 and 13 have come together. Further inward movement of the face plate results in a frictional drag of the wall 20 against the face 25, distorting the gasket in a direction toward its wide end to fill the displacement cavity. This distortion is greater in the outer part of the mass of the gasket than in the inner part, causing the outer part of the lip 23 to be drawn toward the wide end, while the inner part is not so drawn, the result being that the lip is biased by the unequal forces, to flare outwardly, that is, in a direction away from the axis of the impeller. If the volume of the basket is slightly greater than the volume of the gasket channel, the flanges 6 and 13 will not be quite together when the displacement cavity becomes filled, so that further inward movement of the face plate results in extrusion of the excess rubber. This extrusion will be along the inner side of the lip 23, since it is opposed by the drag of the wall 20 against the face 25, which affects the outer part of the mass. The extrusion, therefore, participates with the drag in setting the outward flare of the projecting end of the gasket, which conditions the latter to optimum operative relationship to the corresponding race on the impeller, as will appear.

The suction inlet nozzle 10 is formed with an outer cylindrical bounding wall 30, normal to the flange 11, which cooperates with the inclined inner bounding wall 31 of the face plate 8 when the flanges 9 and 11 are in engagement to form a gasket channel which may be precisely like the channel for the gasket 24. The gasket 32 which occupies this channel is similar to the gasket 24 in its repose shape and its relationship to the confining walls of the channel. It has respective cylindrical and inclined faces 33 and 34, which are longer than the respective complementary faces 30 and 31 of the channel. It has parallel ends 35 and 36 and its base angle 37 is less than a right angle, providing the displacement space 38. When the suction inlet nozzle and face plate are drawn together in the relative positions shown in Figure 3, the pattern of distortion is similar to that described in connection with the gasket 24, the lip becoming flared outwardly, that is, away from the axis of the impeller, under stress of imbalanced distortive forces.

In assembling the gasket system of the subject pump, the gasket 32 is fitted upon the cylindrical seat 30 of the suction inlet nozzle. The annular face plate is then arranged coaxially of the suction inlet nozzle with its bounding inner wall 31 surrounding the gasket, and the two members are bolted tightly together, conforming the gasket to shape of the interior of the channel formed between them and producing the stress-biased flare of the lip 39. Then the gasket 24 is placed upon the cylindrical seat constituted by the bounding outer wall 21 of the face plate, and the unitary closure made up of the bolted together suction inlet nozzle and face plate is arranged coaxially at the side opening in the shell and advanced into the opening progressively until first the wall 20 engages the gasket, and then until the flanges 6 and 13 come together, whereupon, the closure is bolted to the shell.

The impeller, on the side facing the shell opening, is integrally formed with the concentric outer and inner circular races 40 and 41 which are concentric with the axis of the impeller. These project from the side of the impeller to form the annular space 42 which, closed by the adjacent annular wall 43 of the face plate, forms a chamber for the high pressure water, preventing the back flow between the high and low pressure areas of the pump. The water is admitted by way of a pipe 44, connected to the threaded bore 44' in the face plate.

The races are provided with the outer chamfered machined faces 45 and 46, these being the only parts of the sealing system that have to be machined. The diameters of the races are such that the machined faces register within the flared lips, with the respective gaskets, the outwardly curved inner surfaces of said lips making pressure contact with the machined faces of the gaskets, in the repose position of said gaskets, that is, when the high pressure water is not turned on. The lips extend a relatively short distance from the face plate and terminate short of the side wall of the impeller, so that there is a clearance space 48 between their ends and the side of the impeller. In operation, when the high pressure water is in action, a very small portion of this lifts the lip 23 from its seat and escapes into the discharge channel of the pump, functioning to lubricate the interfacial surfaces of the lip 23 and machined face 45. The pressure of the water in the chamber 42 biases the lip 39 of the inner gasket firmly against its seat. Lubrication of the interface between the lip 39 and the machined face 46 of the inner race may be obtained by forming the lip 39 with circumferentially displaced passages 50 therethrough, opening at one end in said interface and at the other, into the chamber 42.

The underlying principle of the subject sealing system is to provide an annular gasket of rubber or like substance, deformable but incompressible, and of wedge shaped cross-section, the thin edge forming an unconfined lip but the rest of the mass being confined within a channel, being initially a displacement space between itself and the rear end of the channel, more capacious in a direction away from the axis of the annulus, and reducing the initial volume of the channel so as to squeeze the confined part of the gasket until it fills the displacement space, the differential flow of the substance of said gasket incident to such displacement biasing the lip to flare in a direction away from said axis.

While I have in the above description disclosed a practical embodiment of the invention, it will be understood by those skilled in the art that the specific details of construction and arrangement of parts are by way of example and not to necessarily exclude other constructions or arrangements which may come within the scope of the invention.

What I claim is:

1. In a sealing system in which the flared lip of an annular gasket carried by one of two relatively rotatable coaxial members makes a joint with a circular race carried by the other of said members, the gasket-carrying member comprising complementary elements, one being formed with an annular rabbet having one wall thereof cylindrical and coaxial with the axis of rotation, and another wall lying in a plane substantially perpendicular to the axis of rotation, the other element having a conical coaxial wall flaring in the direction of the perpendicular wall of said rabbet, said elements being relatively axially translatable to a position in which the conical wall surrounds the cylindrical wall with its outer end contacting said perpendicular wall and its inner end spaced from the adjacent end of said cylindrical wall, a gasket channel of trapezoidal cross-sectional shape being thus formed, having a narrow annular mouth, an annular rubber-like gasket of wedge-shape cross-section having an inner cylindrical face seated upon said cylindrical wall, an outer conical face having substantially the same pitch as said conical wall, and a rear face adjacent said perpendicular wall, said gasket being longer than said gasket channel whereby a lip protrudes from the mouth of said channel, said gasket in respose state being slightly thicker than the thickness dimension of said channel and having its rear face displaced at an acute angle to its cylindrical face whereby in the translatory relative axial movement of said members toward a position in which the forming of said gasket channel is consummated, the frictional drag of said conical wall against the corresponding face of said gasket establishes a strain in the outer portion of the mass of said gasket in a direction away from the mouth of said channel, causing said lip to bend outwardly, the convex side of said lip being in pressed engagement with said race.

2. In a centrifugal pump including a rotor and surrounding casing, means for sealing the joint between said rotor and casing on the inlet side of the pump to prevent re-circulation of liquid from the circumference to the inlet by bypassing through said joint, said means comprising cooperating gasket channel forming members coaxial with said rotor on the inlet side, one in surrounding relation to the other, the surrounded member being formed with a deep exterior rabbet defining a cylindrical wall and a wall extending radially therefrom, the surrounding member having a conical interior wall convergent toward said rotor, said cylindrical and conical walls being coaxial with said rotor, said members being relatively movable in an axial direction to bring said cylindrical conical and radial walls into juxtaposition to form a wedge-shaped gasket channel, said conical and cylindrical walls being so spaced as to provide a narrow mouth for said channel, an annular rubber-like gasket of wedge-shaped cross-section, having an inner cylindrical face seated upon said cylindrical wall, an outer conical face having substantially the same pitch as said conical wall, and a rear face adjacent said radial wall, said gasket being longer than said gasket channel whereby a lip protrudes from the mouth of said channel, said gasket in repose state being slightly thicker than the thickness dimension of said channel and having its rear face displaced at an acute angle to its cylindrical face whereby in the translatory relative axial movement of said members toward a position in which the forming of said gasket channel is consummated, the frictional drag of said conical wall against the corresponding face of said gasket establishes a strain in the outer portion of the mass of said gasket in a direction away from the mouth of said channel, causing said lip to bend outwardly, and a coaxial race on said rotor, the inner side of said lip being in pressed engagement with said race.

3. In a centrifugal pump including a rotor and surrounding casing the latter having an opening on the inlet side coaxial with said rotor, an annular inlet nozzle at the center of said opening and an annular face plate between said nozzle and the bounding wall of said opening, said bounding wall and the interior wall of said face plate being conical, coaxial with said rotor and convergent toward said rotor, said inlet nozzle and said face plate being formed exteriorly with circumferential rabbets each defining a cylindrical wall coaxial with said rotor, and a wall extending radially therefrom, said inlet nozzle being axially movable to bring its cylindrical and radial walls into juxtaposition with the conical wall of said face plate thereby forming a wedge-shaped gasket channel, and said face plate being axially movable to bring its cylindrical and radial walls into juxtaposition to the conical wall of said opening to define a similar gasket channel, the cylindrical and conical walls of each channel being spaced to provide a narrow mouth for said channels, an annular rubber-like gasket for each channel of wedge-shaped cross-section, having an inner cylindrical face seated upon the corresponding cylindrical wall, an outer conical face having substantially the same pitch as said conical wall, and a rear face adjacent the corresponding radial wall, said gasket being longer than said gasket channel whereby a lip protrudes from the mouth of said channel, said gasket in respose state being slightly thicker than the thickness dimension of said channel and having its rear face displaced at an acute angle to the corresponding cylindrical wall whereby in the translatory relative axial movement of said members toward a position in which the forming of said gasket channel is consummated, frictional drag of said conical wall against the corresponding face of said gasket establishes a strain in the outer portion of the mass of said gasket in a direction away from the mouth of said channel, causing said lip to bend outwardly, the convex side of said lip being in pressed engagement with said race.

4. In a sealing system for the joint between relatively rotatable members, an annular race on one member concentric with the axis of said joint, the other member including two relatively axially movable parts defining between them an annular gasket channel coaxial with the axis of rotation, operatively positioned adjacent said race, one of said parts being formed with an exteriorly coaxial cylindrical gasket seat and the other with an interior coaxial conical wall convergent toward said race, adapted to be moved to a position surrounding said cylindrical wall, said conical wall being spaced from said cylindrical wall when in surrounded position to provide a narrow mouth for said gasket channel, an annular rubber-like gasket of wedge-shape cross-section seated upon said cylindrical wall and having an exterior conical face of substantially the same angle of convergence as said conical wall, said gasket having a portion protruding from said mouth forming a lip, said gasket being thicker than the thickness dimension of said channel whereby in the translatory relative axial movement of said parts toward a position in which the forming of said gasket channel is consummated, the frictional drag of said conical wall against the corresponding face of said gasket establishes a strain in a direction away from the mouth of said channel, causing said lip to bend outwardly, the convex side of said lip being in pressed engagement with said race.

References Cited in the file of this patent

UNITED STATES PATENTS

| | | |
|---|---|---|
| 1,525,884 | Plummer | Feb. 10, 1925 |
| 1,947,148 | Andersen | Feb. 13, 1934 |
| 2,013,499 | Meckenstock | Sept. 3, 1935 |
| 2,163,464 | Llewellyn | June 20, 1939 |
| 2,223,653 | Allen | Dec. 3, 1940 |
| 2,312,422 | Kumlin et al. | Mar. 21, 1943 |
| 2,433,589 | Adams | Dec. 30, 1947 |